United States Patent
Aitken et al.

(10) Patent No.: US 7,143,609 B2
(45) Date of Patent: *Dec. 5, 2006

(54) LOW-TEMPERATURE FABRICATION OF GLASS OPTICAL COMPONENTS

(75) Inventors: Bruce G Aitken, Corning, NY (US); Dilip K Chatterjee, Rochester, NY (US); Daniel H Raguin, Acton, MA (US)

(73) Assignee: Corning Incorporated, Corning, NY (US)

(*) Notice: Subject to any disclaimer, the term of this patent is extended or adjusted under 35 U.S.C. 154(b) by 399 days.

This patent is subject to a terminal disclaimer.

(21) Appl. No.: 10/283,402

(22) Filed: Oct. 29, 2002

(65) Prior Publication Data

US 2004/0079114 A1     Apr. 29, 2004

(51) Int. Cl.
*C03B 23/00* (2006.01)
*C03C 3/32* (2006.01)

(52) U.S. Cl. .................... 65/26; 65/374.12; 65/319

(58) Field of Classification Search .............. 65/24, 65/26, 319, 374.1–374.13; 249/114.1; 264/1.7; 427/135; 501/45
See application file for complete search history.

(56) References Cited

U.S. PATENT DOCUMENTS

| | | | |
|---|---|---|---|
| 3,961,929 A | 6/1976 | Stockdale | 65/35 |
| 4,388,097 A | 6/1983 | Turk et al. | 65/64 |
| 4,481,023 A | 11/1984 | Marechal et al. | 65/64 |
| 4,734,118 A | 3/1988 | Marechal et al. | 65/102 |
| 4,854,958 A * | 8/1989 | Marechal et al. | 65/64 |
| 4,921,519 A * | 5/1990 | Schinker et al. | 65/39 |
| 4,969,944 A | 11/1990 | Marechal et al. | 65/104 |
| 5,026,415 A * | 6/1991 | Yamamoto et al. | 65/305 |
| 5,076,980 A | 12/1991 | Nogues et al. | 264/65 |
| 5,108,477 A | 4/1992 | Cornelius et al. | 65/18.1 |
| 5,276,538 A | 1/1994 | Monji et al. | 359/40 |
| 5,284,501 A * | 2/1994 | Monji et al. | 65/32.5 |
| 5,346,523 A * | 9/1994 | Sugai et al. | 65/102 |
| 5,623,368 A | 4/1997 | Calderini et al. | 359/619 |
| 5,744,409 A * | 4/1998 | Hashimoto et al. | 501/65 |

(Continued)

FOREIGN PATENT DOCUMENTS

EP    1069082 A2    1/2001

(Continued)

OTHER PUBLICATIONS

Xianghua Zhang, "Chalcogenide Glass 'Molds' Thermal Imaging", Laser Focus World.

*Primary Examiner*—Carlos Lopez
(74) *Attorney, Agent, or Firm*—Walter M. Douglas; Vincent T. Kung

(57) ABSTRACT

A method is provided for molding from glass certain complex optical components, such as lenses, microlens, arrays of microlenses, and gratings or surface-relief diffusers having fine or hyperfine microstructures suitable for optical or electro-optical applications. Thereby, mold masters or patterns, which define the profile of the optical components, made on metal alloys, particularly titanium or nickel alloys, or refractory compositions, with or without a non-reactive coating are used. Given that molding optical components from oxide glasses has numerous drawbacks, it has been discovered in accordance with the invention that non-oxide glasses substantially eliminates these drawbacks. The non-oxide glasses, such as chalcogenide, chalcohalide, and halide glasses, may be used in the mold either in bulk, planar, or power forms. In the mold, the glass is heated to about 10–110° C., preferably about 50° C., above its transition temperature (Tg), at which temperature the glass has a viscosity that permits it to flow and conform exactly to the pattern of the mold.

41 Claims, 10 Drawing Sheets

U.S. PATENT DOCUMENTS

| | | | |
|---|---|---|---|
| 5,852,516 A | 12/1998 | Chipper | 359/676 |
| 5,876,642 A | 3/1999 | Calderini et al. | 264/2.5 |
| 5,910,256 A | 6/1999 | Tsunetomo et al. | 216/24 |
| 5,938,807 A * | 8/1999 | Komiyama et al. | 65/29.12 |
| 6,003,336 A * | 12/1999 | Kashiwagi et al. | 204/192.15 |
| 6,003,338 A * | 12/1999 | Yamamoto et al. | 65/102 |
| 6,105,395 A | 8/2000 | Yoshida et al. | 65/102 |
| 6,119,485 A * | 9/2000 | Hibino et al. | 65/305 |
| 6,151,915 A | 11/2000 | Hirota et al. | 65/26 |
| 6,151,917 A * | 11/2000 | Hibino et al. | 65/169 |
| 6,178,281 B1 | 1/2001 | Sautter et al. | 385/129 |
| 6,230,520 B1 * | 5/2001 | Hirota et al. | 65/25.1 |
| 6,784,128 B1 * | 8/2004 | Otsuka et al. | 501/48 |

FOREIGN PATENT DOCUMENTS

| | | |
|---|---|---|
| JP | 02-160631 | 6/1990 |
| JP | 04-092827 | 3/1992 |
| JP | 06-056442 | 3/1994 |
| JP | 06-211540 | 8/1994 |
| WO | WO 93/21120 | 10/1993 |

* cited by examiner

LOW-TEMPERATURE FABRICATION OF GLASS OPTICAL COMPONENTS

FIELD OF THE INVENTION

The present invention pertains to optical components and their manufacture in glass. In particular, the invention relates to methods and apparatus for molding or embossing non-oxide glasses (e.g., chalcogenide glasses) with low glass-transition temperatures ($T_g$) into devices of varied geometry having complex or fine surface features.

BACKGROUND

Optical elements have had various uses in many diverse technologies, including sensors, image projectors, displays (e.g., liquid crystal display (LCDs), plasma display, and electro-luminescence display), as well as opto-electronic devices for telecommunications. As the telecommunications industry develops, the need to develop precision optical elements that incorporate microstructures increases. In telecommunication devices, optical elements may be used, for instance, in fiber and laser couplers, optical switches, or as diffraction gratings for WDM applications, and densely packed microlens arrays (MLAs) or networks for wavelength management modules or collimator applications. Precision optical elements require highly polished surfaces or exacting surface figures and qualities. The surfaces demand fabrication in proper geometric relationship to each other; and, where the elements are to be used in transmission applications, they will be prepared from a material of controlled, uniform, and isotropic refractive index.

Numerous methods and materials may be used to fabricate complex, precision optical elements. Because a great majority of conventional machining processes for the manufacture of optical components are unsuited for producing very small features, components having surface features or dimensions of 500 microns or smaller typically can be fabricated only through a few methods of limited applicability. Fabrication of microstructured surfaces using polymers have leveraged off of processes developed by the semiconductor industry for making integrated circuits. Using photolithography and ion etching techniques, some have created submillimeter surface features. These methods, however, are not conducive to large-scale manufacturing. The process time needed to etch a microstructure is proportionally dependent on the required total depth of the microstructure. Moreover, the methods are not only expensive, but can produce only a limited range of feature types. Also, etching processes can create rough surfaces. A smooth concave or convex profile or true prismatic profiles cannot be readily achieved using either of the two aforementioned techniques.

Molding or hot embossing of plastics or glass materials, on the other hand, can form submillimeter-sized features. Plastics can conform to molds and reproduce faithfully intricate designs or fine microstructures. Unfortunately for many telecommunication applications, plastic materials are not ideal since they suffer from several shortcomings. Plastic materials are often not sufficiently robust to withstand, over time, environmental degradation. First, they exhibit large coefficients of thermal expansion, and limited mechanical properties. Plastic optical devices often cannot long withstand humidity or high temperatures. Both the volume and refractive indices of plastics can vary substantially with changes in temperature, thereby limiting the temperature range over which they may be useful. Plastics cannot transmit high-power light, due to internal heating of the material. Thus, well before a plastic component actually melts, its surface features will degrade and its index of refraction may change. Either change is unacceptable in an optical context. Furthermore, since plastics for optical applications are available in a limited range of dispersion and refractive index, plastics can provide only a restricted transmission range. Hence, their usefulness even within the restricted bandwidth is limited by the tendency to accumulate internal stresses, a condition that results in distortion of transmitted light during use. In addition, many plastics can scratch easily and are prone to yellowing or developing haze and birefringence. Application of abrasive-resistant and anti-reflective coatings, unfortunately, still has not fully solved these flaws. Finally, many chemical and environmental agents degrade plastics, which makes them difficult to clean effectively.

In comparison, glass possesses properties that make it a better class of optical material over plastics. Glass normally does not suffer from the material shortcomings of plastics, and it can better withstand detrimental environmental or operational conditions. Hence, glass is a more preferred material. Glass optical components represent a different class of devices than those made from plastics and the molding processes used are more stringent.

Precision optical elements of glass are customarily produced by one of two complex, multi-step processes. In the first, a glass batch is melted at high temperatures and the melt is formed into a glass body or gob having a controlled and homogeneous refractive index. Thereafter, the glass body may be reformed using repressing techniques to yield a shape approximating the desired final article. The surface quality and finish of the body at this stage of production, however, are not adequate for image forming optics. The rough article is fine annealed to develop the proper refractive index and the surface features improved by conventional grinding and polishing practices. In the second method, the glass melt is formed into a bulk body, which is immediately fine annealed, cut and ground into articles of the desired configuration.

Both of these methods have their limitations. On one hand, grinding and polishing are restricted to producing relatively simple shapes, such, such as flats, spheres, and parabolas. Other shapes and general aspheric surfaces are difficult to grind and complicated to polish. On another hand, conventional techniques for hot pressing of glass do not provide the exacting surface features and qualities, which are required for clear image forming or transmission applications. The presence of chill wrinkles in the surface and surface figure deviations constitute chronic afflictions.

The molding of glass traditionally has presented a number of other problems. Generally, to mold glass one must use high temperatures, typically greater than about 700° C. or 800° C., so as to make the glass conform or flow into a requisite profile as defined by a mold. First, at such relatively high temperatures, glass becomes highly chemically reactive. Due to this reactivity of glass, highly refractory molds with inert contact surfaces are required. Some materials used to fabricate molds include silicon carbide, silicon nitride or other ceramic materials, or intermetallic materials, such as iron aluminides, or hard materials, such as tungsten. In many cases, however, such materials do not present sufficient surface smoothness or optical quality for making satisfactory optical surface finishes. Precision optical elements require highly polished surfaces of exacting microstructure and quality. Metal molds can deform and re-crystallize at high temperatures, which can adversely affect the surface and optical qualities of the article being molded. This means additional costs to repair and maintain the molds and higher defects in the product. Second, also due to the reactivity of the glass at high temperatures, often the molding need to be done in an inert atmosphere, which complicates the process. Third, the potential for air or gas bubbles to be entrapped in the molded articles is another drawback of high-temperature molding. If captured within the glass, gas bubbles tend to degrade the optical properties of the article. The bubbles distort images and generally disrupt optical transmission. Fourth, even at high temperatures, hot-glass molding cannot create efficiently on the surface intricate, high-frequency, submillimeter microstructures, such as those required for diffraction gratings.

In the past, workers in the field of molding technology have endeavored to develop several techniques for the manufacture of optical elements. These techniques, however, have yet to satisfactorily overcome the deficiencies of glass molding. Hence, a new method or an improvement of existing technology is needed to for the manufacture of precision optical elements with deep or fine microstructures, such for diffraction gratings or microlenses. The method should be cost-efficient, expedient and enable high-volume, mass production of fine-figured microstructures in multiple, identical glass optical elements. The present invention can satisfy these needs.

SUMMARY OF THE INVENTION

The present invention pertains, in part, to a cost-effective method of making a precision optical element with fine optical microstructures by means of molding or embossing. It has been discovered in accordance with the present invention that the drawbacks associated with glass molding can be substantially eliminated through the use of non-oxide based glasses as the material to be molded. Suitable glass compositions include chalcogenide, chalco-halide, and halide glasses, which typically all have low glass transition temperatures ($T_g$). An example of a halide glass may be a fluoro-zirconate glass (e.g., ZBLAN). Of the three kinds of glass, a sulfide glass is preferred, or more particularly, a germanium-arsenic-sulfide glass. The advantages of a non-oxide or chalcogenide glass includes high refractive index, lower molding temperature, excellent thermal stability and good environmental durability. The high refractive indices of these glasses are particularly beneficial, since they reduce the extent of sag required for making a lens of a given focal length. The low molding temperatures of these glasses are attractive because they obviate the need for expensive molds or masters, such as chemically vapor deposited silicon carbide or silicon nitrides, required for molding higher-temperature oxide glasses.

In brief, the method of manufacture comprises several steps. First, provide a non-oxide glass with a Tg of up to about 550° C. Second, provide a mold having at least a first portion and a second portion. At least an active, molding surface is formed of a material selected from: titanium alloys; nickel alloys; silicon carbide; silicon nitride; or refractory ceramic composite of silicon carbide and silicon nitride, or a refractory ceramic composite of silicon carbide and silicon nitride, or a refractory metal such as tungsten and its alloys. The mold components have an active surface that has an optical finish and can be used with or without a a protective coating. Place the glass in the mold. Then, heat the glass, the mold, or both to an operational temperature from about 10° C. to about 110° C. above the $T_g$. Press the mold when the viscosity of the glass reaches about $10^6$–$10^{12}$ poise. At room temperature, the glass may take the form of granular, planar, bulk-solid items (e.g., respectively, a powder frit, a wafer or planar (disk) body, a bulk-solid ingot or monolith of any practical three-dimensional shape), or a combination thereof. When the glass is in the form of a wafer or powder, the method further comprising inserting blocks into the mold. When blocks are used, the method may further comprise applying or placing a layer of material, which is non-reactive with the glass at the operational temperature, on a surface of the blocks that is in contact with the glass material. This release coating, such as a boron nitride, may be spray coated or sputtered on the surfaces of the mold defining the profile or the master defining the pattern. The method further comprises the steps of hardening the glass in the mold either through natural or forced cooling, then removing the glass. Further processing of the resultant embossed or molded glass article may be included, such as fine annealing or polishing. The present method permits the glass to be Once heated to the operational temperature, under pressure, the glass sags into the mold to conform to a master design, whereby the surface-relief structure of the master is transferred into the glass. When the starting materials are granular in form, such as glass frit, the molding process can sinter the individual glass particles into a solid article without trapping air pockets or other occlusions, which may mar the final product. Unlike certain methods indicated before such as, grinding, polishing, reactive ion etching, which are based on precise material removal processes, in the present fabrication process, fabrication times are not dependent on, nor directly determined by the depth of the microstructure.

In another aspect, the present invention relates to a mold assembly comprising a first or upper component and a second or lower component. The mold may be made using a variety of materials, which may include for example silicon carbide; silicon nitride; a refractory ceramic or composite of the two or more metals, alloys, ceramics and glass. A preferred material is a titanium alloy of a nominal composition, in terms of weight percent, consisting essentially of about: 80–98% Ti (titanium); 1–10% Al (aluminum); and 1–10% V (vanadium). Titanium alloys of such compositions have been used in military aircraft compressors and bio-implants but not employed as mold materials for glass moldings. Surface treatment of Ti-6Al-4V alloys, such as nitriding, can improve surface wear properties of the material.

Additional features and advantages of the present molding/embossing of glasses will be explained in the following detailed description. It is understood that both the foregoing general description and the following detailed description and examples are merely representative of the invention, and are intended to provide an overview for understanding the invention as claimed.

BRIEF DESCRIPTION OF THE DRAWINGS

The foregoing and other objects, features and advantages of the invention will become more apparent from a reading of the following description in connection with the accompanying drawings in which.

DETAILED DESCRIPTION OF THE INVENTION

The present invention provides, in part, a one-step process of fabricating complex optical components, such as gratings, lenses of short focal length, or high-density microlens arrays (MLAs). The process overcomes the molding limitations of other glass molding methods. Optical lenses have had various uses in many diverse technologies or applications, such as in television or computer displays (e.g., LCDs).

To be technically precise, molding refers to a process of shaping a ductile or fluid starting material to a final object and the embossing refers particularly to a process of imprinting a design on the final object. Molding and embossing, however, are synonymous for the purpose of this invention. As used herein, the term 'molds' and 'masters' are also synonymous: the mold is normally used for shaping process and the master is used for imprinting designs.

Figure 1:
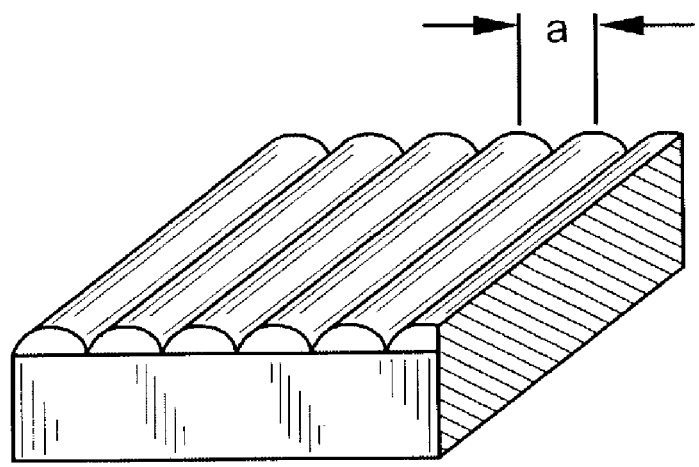
FIG. 1 is an isometric view of a cylindrical lens array.
Figure 2:
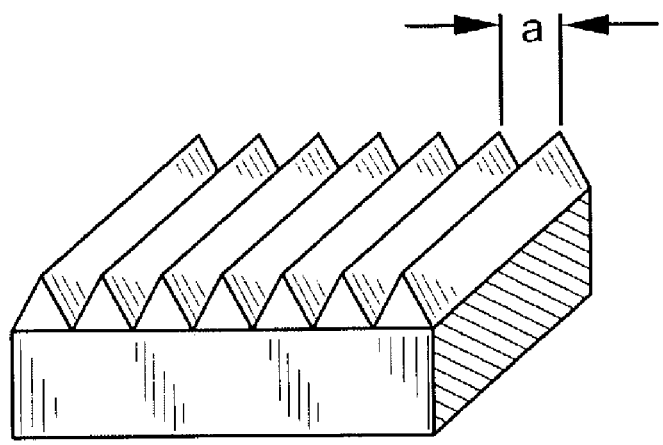
FIG. 2 is an isometric view of a prismatic lens array.
Figure 3:
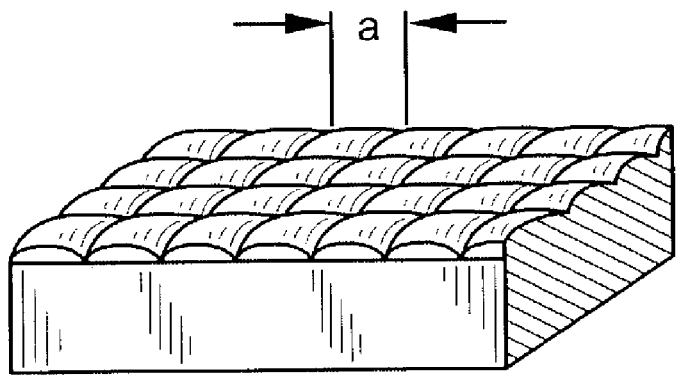
FIG. 3 is an isometric view of an array of hyperfine lenses having a high-density factor.
Figure 4:
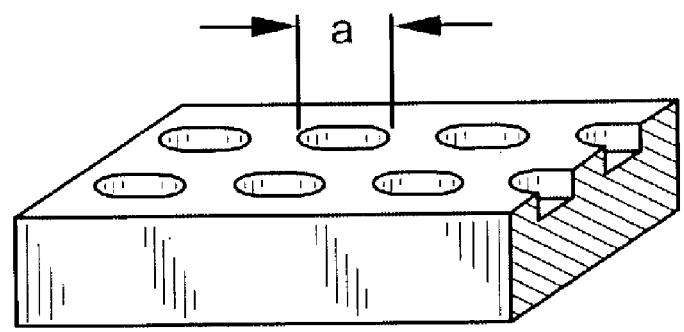
FIG. 4 is an isometric view of an array of hyperfine lenses having a low-density factor.

As used herein, the term "fine microstructure" refers to a single lens, a lenslet or an array of lenses having smooth, curved features less than or equal to about 500 microns along at least one dimension. The individual lens elements may be concave or convex; spherical, aspherical or fresnel; cylindrical (as illustrated in FIG. 1) or prismatic (FIG. 2); and disposed on either a planar substrate or one a curved substrate. Arrayed lenses may be produced in various densities. In a "high-density factor" array, as shown in FIG. 3, the lens elements abut or lie close to one another; an a "low-density factor" array, as shown in FIG. 4, the lens elements are spaced wider apart. In all four illustrations, the dimension "a" is less than or equal to about 500 microns.

As used herein, the term "hyperfine microstructure" refers to a single lens, a lenslet or an array of lenses or microlenses having smooth, curved features less than or equal to about 100 microns along at least one dimension, preferably less than or equal to about 10 microns.

Figure 5:
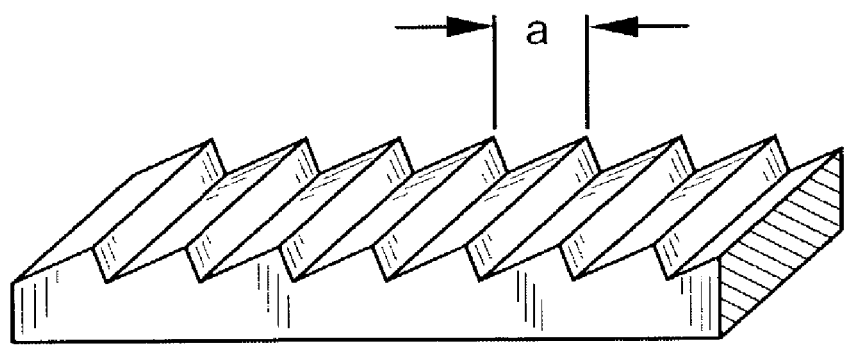
FIG. 5 is an isometric view of a blazed-type hyperfine grating.
Figure 6:
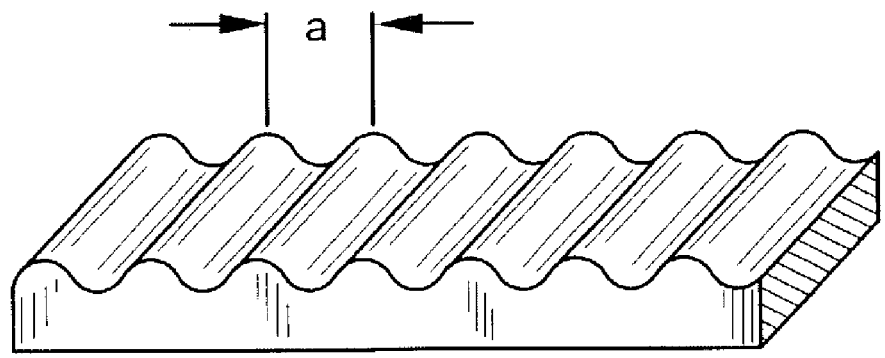
FIG. 6 is an isometric view of a sinusoidal-profile hyperfine grating.

As used herein, the term "fine grating" refers to a blazed-type grating, as illustrated in FIG. 5, or surface-relief diffuser, with groove spacing "a" less than or equal to about 500 microns; or a curved-profile grating, as illustrated in FIG. 6, with groove spacing "a" less than or equal to about 500 microns. The depth of the grooves can be up to about 100 microns deep. The groove spacing may be variable or fixed. The grooves themselves may be disposed on a planar or surfaced surface.

As used herein, the term "hyperfine grating" refers to a blazed-type grating, as illustrated in FIG. 5, or surface-relief diffuser, with groove spacing "a" less than or equal to about 100 microns, preferably less than or equal to about 10 microns.

Depending on the particular material, hyperfine gratings and lenses may reflect or transmit optical radiation. Generally, the molding, isothermal pressing and/or embossing of oxide glasses are high-temperature processes, involving temperatures in the range of about 700–1200° C. or greater. Oxide-based glasses, particularly glasses containing silicates and lead oxides are highly reactive in their softened state. To prevent chemical reaction between the mold material and the softened glass, expensive mold materials, such as chemical vapor-deposited (CVD) silicon carbide, reaction bonded silicon nitrides and hard refractory metals and alloys, are required along with release coatings on the molding surfaces.

As an alternative, researchers have turned to sol-gel processes to produce highly transparent glass, relatively opaque ceramics, or hyperfine-featured surfaces, such as described in U.S. Pat. No. 5,076,980, or PCT Application Publication No. 93/21120, which are incorporated herein by reference. Workers in the field believed that to mold hyperfine features in glasses would be rather difficult since vitreous materials retain significant viscosity at practical working temperatures, which would prevent the molten glass from accurately and reliably conforming to the hyperfine-featured mold.

We have found, however, that non-oxide glasses, in particular chalcogenide glasses, function very well for molding hyperfine featured surfaces in contrast to common optical or non-optical glasses that contain some type of oxide, such as oxides of silicon, aluminum, boron, lead and the like. For many specialized applications in optics, optoelectronics, and optical telecommunications, more particularly, development and application of non-conventional glasses may be the only practical material for engineers to use. It is believed that the ability to produce consistently by a molding process optical elements, such as microlenses or diffractive gratings, having sharp transition angles with features on the order of microns or submicrons, is not obvious from previous glass molding technologies using either oxide or non-oxide glasses.

Chalcogenide glasses are distinguished in their material compositions from conventional optical glass families, in that they contain in their glass-forming matrix a chalcogen element instead of oxygen. A chalcogen element may be one or more elements of the sulfur group (e.g., S, Se, or Te) in the periodic table, and may be combined with arsenic, antimony, germanium, phosphorous, gallium, indium, etc. Additionally, chalcogen elements may be mixed with a halide (fluorine, chlorine, bromine, iodine) to create chalcohalide glasses. Since sulfides generally react with ambient oxygen at high temperatures, it was thought that the reactivity of such glasses would be a major obstacle for development of a molding process. The chalcogenide glasses, however, were unexpectedly resilient to chemical reaction in ambient atmosphere, and has little potential for undesired deformation or contamination during the manufacturing process.

Moreover, chalcogenide glasses have very interesting properties, which further distinguish them from conventional oxide-based glasses. Chalcogenides exhibit excellent optical transparency in the near and far infrared (IR) spectral region (>700 nano-meters (nm)). This is an important attribute of chalcogenide glasses for fabricating optical lenses, since optical telecommunication uses transmittance in the infrared spectrum. Silicates, by comparison, tend to absorb or are opaque in the mid-IR. Moreover, chalcogenides may be used in heat sensing applications, such as for forward looking infrared (FLIR) systems, or guidance in the nose of a missile. Certain chalcogenide glasses have potential applications as infrared transmitting materials and as switching devices in computer memories, because their conductivity changes abruptly when particular threshold values are exceeded. Moreover, chalcogenide glasses can function as semiconductors, not insulators as are most common oxide glasses, and are better thermal conductors; thereby, having the potential for better thermal management when packaged in modules for telecommunication uses.

Other advantages of chalcogenide glasses include high refractive indices. One does not necessarily need to have an aspheric lens when lenses can be made from a non-oxide glass with a higher index of refraction. Generally, chalcogenide glasses exhibit higher refractive indices in the range of about 1.8 to greater than 3, preferably $\geq 2.0$, which affords much flexibility in design parameters, such as sag of a lens or period of a grating. Using smaller sag, one can produce lenses with reduced radii of curvature, and optical refractive lenses with less distortion in the optical pathway than oxide glasses with lower refractive indices of $\leq 1.5$. Thus, a spherical lens is not a handicap in this situation. The distance of the vertex to the plane of substrate is less. Hence, the sag required is smaller and shallower. Chalcogenide glasses also exhibit third-order, non-linear refractive index of about 80 to 1000 times higher than that for silica; and, their phonon level energy is very low ($\sim$300 cm$^{-1}$), which makes them an excellent host for optical amplifiers or lasers doped with rare earth element ions (e.g., erbium (Er), neodymium (Nd), praseodymium (Pr), thulium (Tm), ytterbium (Yb), etc.).

In contrast to oxide-based glasses, chalcogenide glasses exhibit lower softening temperatures and low glass transition temperatures, Tg ($\sim 10^{13.4}$ poises). This feature makes chalcogenide glasses attractive candidates for molding or embossing. As used herein, the term "low-Tg" refers to a glass that has a Tg $\leq$ about 500° C. Oxide-based glasses such as silicates typically have a high Tg over about 600° C. and are prone to chemically react with the material of the mold. Although phosphate glasses have $T_g \sim$300–320° C., and can be molded at about 400–450° C., they have refractive indices that are considerably lower than chalcogenide glasses. Hence, phosphates require greater sag to produce comparable lens or other optical elements.

Chalcogenide glasses can be molded at temperatures of about 200–600° C. or less, typically about 250–350° C., depending on composition, since they characteristically have glass transition temperatures ($T_g$) of less than about 500° C. Although some chalcogenide glasses have Tg in about 350–480° C., more commonly, the Tg is less than or equal to about 300° C. (e.g., $\sim$130° C. or $\sim$190° C. to $\sim$200° C. or $\sim$250° C.). Hence, one can take advantage of the low temperature properties of chalcogenides to achieve adequate fluidity to permit 'hyperfine structure' molding.

Chalcogenide glasses generally have coefficients of thermal expansion, on the order of about 10–50 ppm/° C., or for the examples in Table 1, of about 20–40 ppm/° C. The thermal coefficients of the mold material selected may be in the order of about 2 to 40 ppm/° C., preferably about 5–30 ppm/° C. Considering the field of Ge—As-sulphide glasses, the compositional range of moldable glasses, which would satisfy the parameters of the mold, includes about 0–35% Ge, about 0–55% As, about 30–85% S. To modify the optical, thermal, and/or mechanical properties of these glasses, phosphorus (P), gallium (Ga), indium (In), selenium (Se), tin (Sn), antimony (Sb), tellurium (Te), thallium (Tl) chlorine (Cl), bromine (Br), and iodine (I) may be added as optical constituents. Other elements, such as the rare earths, or fluxes (e.g., Li, Na, K) may be also included.

In Table 1, we compare the material and optical properties of a few select chalcogenide and oxide-based glasses. For two chalcogenide glasses, Examples 1 and 2, Table 1 gives their properties and respective concentrations in atomic percent of germanium, arsenide, and sulfur. Example 3 is a low-$T_g$($\sim$330° C.) oxide-based glass having a fluorine-free composition, as disclosed in U.S. Pat. No. 5,021,366, incorporated herein by reference. The glass of Example 3 is currently being manufactured and distributed to companies that mold optical elements (e.g., Geltech, Orlando, Fla.; Eastman Kodak, Rochester, N.Y.). Example 4 is an oxide-based glass by Schott Glass Technologies, Inc., and Example 5 is fused silica (HPFS®) by Corning, Inc. One notes from Table 1 that the Tg of each of the chalcogenide glasses is lower than that of the other oxide-based glasses, including that of Example 3.

TABLE 1

Material & Optical Properties of Select Chalcogenide & Oxide-based Glasses

| Property | Ex. 1 (8.75% Ge, 17.5% As, 73.75% S) | Ex. 2 (12.5% Ge, 25% As, 62.5% S) | Ex. 3 (Phosphate glass, Corning, Inc.) | Ex. 4 (Oxide glass, Schott Glass Technologies, Inc.) | Ex. 5 Fused Silica (HPFS from Corning, Inc.) |
|---|---|---|---|---|---|
| Index of refraction ($n_D$) at the sodium D line, 589 nm | $\sim$2.37 | $\sim$2.48 | 1.60 | 1.51 | 1.46 |
| Index of refraction ($n_{1549}$) at 1549 nm | 2.186 | 2.284 | | | |
| dn/dT (ppm/° K.) | NA | NA | $\sim$11.0 | 2.5 | 10 (in Nitrogen) |

TABLE 1-continued

Material & Optical Properties of Select Chalcogenide & Oxide-based Glasses

| Property | Ex. 1 (8.75% Ge, 17.5% As, 73.75% S) | Ex. 2 (12.5% Ge, 25% As, 62.5% S) | Ex. 3 (Phosphate glass, Corning, Inc.) | Ex. 4 (Oxide glass, Schott Glass Technologies, Inc.) | Ex. 5 Fused Silica (HPFS from Corning, Inc.) |
|---|---|---|---|---|---|
| Wavelength transmission range (nm) | 530–>2400 | 560–>2400 | 400–1600 | 350–2000 | 200–2000 |
| CTE (ppm/° C.) | 40 | 20 | 15 | 7.1 | 0.52 |
| Density (g/cm$^3$) | 2.72 | 3.03 | 3.80 | 2.51 | 2.20 |
| Tg (° C.) | ~150–160 | ~245 | 330 | 559 | 1585 |
| Ts (° C.) Softening Point | ~261 | ~348 | | | |

In general, chalcogenide glasses will be more likely than conventional oxide-based glasses to oxidize or otherwise react chemically in air when heated. Despite this, however, we have discovered surprisingly that chalcogenide glasses (Ge—As sulfides) may be molded in air without undergoing any detectable oxidization. Example glasses of $Ge_{25}As_{50}S_{60}$ and $Ge_{8.76}As_{17.5}S_{73.75}$—respectively have Tg of 245° C. and 150° C., CTE of 20 and 35 ppm/° C. Thus, when employing chalcogenides glasses according to the present invention, the need to use an inert atmosphere during the processing of the glass is either abated or eliminated, which is a great advantage.

A number of other of suitable chalcogenide glasses will include, for example, sulfide glasses that have a composition comprising, in atomic/element percent, about 25–90% S, 0–50% As, 0–45% Ge; selenide glasses comprising, in atomic/element percent, about 25–100% Se, 0–60% As, 0–45% Ge; or, telluride glasses comprising, in atomic/element percent, about 25–90% Te, 0–50% As, 0–45% Ge. A specific type of germanium-arsenic-sulfide is described in U.S. Pat. No. 6,277,775, incorporated herein, which contains a source of phosphorus ion as a co-dopant to effect dispersion of a rare earth metal ion dopant in the glass. Co-assigned U.S. patent application Ser. No. 09/894,587, incorporated herein, describes another kind of chalcogenide glass, which contains molecular clusters. Another specific chalcogenide example includes a Ge—As selenide glass having a composition in atomic/element percent of about: 12.5% Ge, 25% As, 62.5% Se, with a Tg of about 219° C.

Alternative kinds of glasses may include chalco-halide glasses. Chalco-halide glasses are similar in composition to the sample chalcogenides except for the addition of Cl, Br, and I. A typical system would be glasses encompassed by the member components As—S—I, where Tg can range from below room temperature for very I-rich species to about 250° C. for I-poor compositions. Similar glasses exist in the systems: As—S, Se—Cl, Br; Ge—S, Se—Cl, Br, I and Ge—As—S, Se—Cl, Br, I, as given in the review paper by J. S. Sanghera et al., J. Non-Cryst. Solids, 103 (1988), 155–178, incorporated herein by reference.

Another major class of chalco-halide glasses are the so-called TeX or TeXAs glasses, containing Te and a halogen X with or without a crosslinking element such as As. For thermally stable lenses, the TeXAs glasses would be more preferred over the TeX glasses. Typical examples of these and other chalco-halides are presented by J. Lucas and X-H. Zhang, J. Non-Cryst. Solids 125 (1990), 1–16, and H-L. Ma et al., J. Solid State Chem. 96, 181–191 (1992), incorporated herein by reference.

Halide glasses also may be employed for applications according to the present invention. Particular glass examples may be drawn from the wide family of fluorozirconate glasses of which a typical example, referred to as ZBLAN, has a composition in terms of mole percent of about: 53% $ZrF_4$, 20% $BaF_2$, 4% $LaF_3$, 3% $AlF_3$, 20% NaF, with a Tg of about 257–262° C. Other possible halide glasses include the Cd halides of which the following is a typical example: 17% $CdF_2$, 33% $CdCl_2$, 13% $BaF_2$, 34% NaF, and 3% KF, with a Tg of about 125° C. Broad compositional ranges for these kinds of halide glasses are given in U.S. Pat. No. 5,346,865, incorporated herein, which include: 42–55% CdF2 and/or CdCl2, 30–40% NaF and/or NaCl, 2–20% total of BaF2 and/or BaCl2+ KF and/or KCl, with optional halides as listed.

These two illustrative halide glass families are not necessarily fully inclusive of all halides as there are also fluorindate and fluorogallate glasses in which the major constituents are typically alkaline earth fluorides, (e.g., $ZnF_2$, $CdF_2$ and $InF_3$ and/or $GaF_3$). Having Tgs similar to that of ZBLAN, Tgs for these glasses can range from about 260–300° C. These glasses. A representative example is: 19% $SrF_2$, 16% $BaF_2$, 25% $ZnF_2$, 5% $CdF_2$, 35% $InF_3$, with a Tg of 285° C. When molding halide glasses according to the present invention, it is preferred that a non-reactive coating be used with the mold material to prevent the halide species from reacting with air.

The method of the present invention, in part, is adapted from a proprietary process developed by J. Mareshal and R. Maschmeyer at Corning Inc., which is described in U.S. Pat. Nos. 4,481,023, 4,734,118, 4,854,958, and 4,969,944, the contents of which are incorporated herein by reference. According to the Mareshal-Maschmeyer process, a glass preform having an overall geometry closely approximating that of the desired final product is placed into a mold, the mold and preform are brought to a temperature at which the glass exhibits a viscosity between $10^8$–$10^{12}$ poises, a load is applied to shape the glass into conformity with the mold, and the thereafter the glass shape is removed from the mold at a temperature above the transformational range of the glass and annealed.

In contrast, the present inventive molding process does not require that one use either molten or solidified glass gobs, or that preforms be in a near final shape. The glass material to be molded or embossed may be in the form of regularly or irregularly-shaped bulk-solids, such as ingots or a disc or wafer. For example, one can place a glass wafer, from 0.25 to 2 mm in thickness and 50 to 300 mm in diameter, in between two halves of the mold. Alternatively, fine glass frit powders (e.g., less than 0.1 mm in diameter particle size) may be used. When glass frit is used, the powder contains particles of sufficiently small, irregular-sized glass particles to enable them to consolidate in the heated mold when pressure is applied. The powder consolidates initially to form a preform (such as a wafer, a gob or a rough-shaped lens or grating), which surprisingly contained little if any occlusions. This ability to use glass materials of virtually any shape can reduce fabrication costs and simplify the molding process.

A wide variety of temperatures and molding pressures may be employed successfully to form glass articles of high precision, provided that certain minimum criteria are met:

First, the molding operation will be conducted at temperatures at which the glass has a much higher viscosity when compared with customary glass pressing procedures. Thus, the glass will be molded at viscosities of about $10^6$–$10^{12}$ poises, with a preferred range being about $10^7$–$5\times10^{11}$ poises, and a more preferred range of about $10^8$–$10^{10}$ poises. Any non-oxide glass composition may be deemed a suitable candidate for the inventive molding process, provided a suitable mold material is available, which is capable of being fashioned into a good surface finish, is sufficiently refractory to withstand the pressing temperature and pressure, and is not substantially attacked by the glass composition at molding temperatures.

Second, the inventive molding operation will involve an ostensibly isothermal condition during the period wherein the final figure of the shaped article is being formed. As employed herein, the term isothermal means that the temperature of the mold and that of the glass preform, at least in the vicinity of the mold, are approximately identical. The temperature differences permitted are dependent upon the overall size and specific design of the final glass shape, but the difference will, preferably, be less than 20° C. and, most desirably, less than 10° C. This isothermal condition will be maintained for a period of sufficient length to allow the pressure on the molds to force the glass to flow into conformity with the surface of the mold.

Normally, the glass products molded in accordance with the inventive process contain too much thermal stress to be suitable for use in optical applications and, therefore, a fine annealing step is demanded after molding. Because of the isothermal environment utilized in the pressing procedure, however, and the fact that the molded articles essentially totally conform to the mold surfaces, the articles shrink isotropically, thereby permitting them to be fine annealed without any significant distortion of the relative surface figure. Moreover, this annealing without distortion can be achieved outside of the mold with no elaborate physical support for the molded shape. This practice leads to much shorter mold cycle times and precludes the need for recycling the molds. In summary, there is no need to cool the mold under load with the glass shape retained therewithin to a temperature below the transformation range or transition temperature of the glass. That is, the molds can be held at temperatures where the glass is at a viscosity of about $10^{13}$ poises (the minimum temperature at which the pressed articles are removed from the molds), rather than cooling the molds below the transformation range, perhaps even to room temperature, and then reheating. Such cycling consumes much energy and adversely affects the life of the mold.

An important detail in the development of a glass molding or embossing process is the choice of material from which the mold or master is formed. The mold material should be chemically stable at the operational molding temperature, and it should not react chemically with the glass during molding. In other words, the material of choice for the mold, which defines the profile or pattern to be formed on glass, preferably should possesses a similar thermal expansion to that of the glass and have a recrystalization temperature that is substantially higher than the temperature to which the mold is heated. Usually, it is preferred that the mold has a coefficient of thermal expansion (CTE) that is substantially compatible with the CTE of the glass material. A material with a CTE that satisfies this and the other criteria, however, has been difficult to find. Design parameters need to take account of the large contraction of the glass that occurs when the mold cools when there is a large disparity between CTE of the mold and that of the glass. (It should be noted that, at times, selecting mold/master materials and glasses of differing CTEs may be necessary to take advantage of the differential in expansion and/or contraction to help with the release of the molded/embossed parts from the molds/masters.) Although matching the CTE of the mold material and the glass is important, more important is that the mold material should have a recrystallization temperature of that is substantially higher than the operational temperature of the mold.

Although silicon carbide (SiC), silicon nitride ($Si_3N_4$), refractory ceramic composite of the two could be used to form the mold, ceramic materials, however, can be expensive and require coatings. Refractory metals (such as tungsten) and alloys may also be used as molds, but some materials such as titanium alloys are preferred in practicing the present invention Normally, a large difference in the coefficient of thermal expansion exists between a metal alloy surface compared to that of a glass. A titanium alloy, such as Ti-6Al-4V alloy, however, was unexpectedly discovered to be very suitable for embossing and molding of chalcogenide (sulfide) glasses, particularly glasses with a coefficient of thermal expansions in the range of about 20 to 40 ppm/° C. The titanium alloy has a coefficient of thermal expansion of within the range of approximately 8 to 12 ppm/° C., and a recrystallization temperature in the range of about 700 to 800° C.

Molds made from titanium alloys can be used to process chalcogenide glass blanks up to a temperature of about 500–550° C., which should be suitable for molding such glasses having a Tg of up to about 450° C. or 500° C. The titanium alloy mold is made preferably of a nominal composition, in terms of weight percent, of about: 80–98% Ti (titanium); 10–1% Al (aluminum); 10–1% V (vanadium), preferably consisting essentially, in weight percent, of about 90% Ti, 6% Al, 4% V. Commercially available Ti-6Al-4V alloys are normally used in structural applications for chemical industries and also in military aircrafts, but not for manufacturing glass molds. According to the present invention, the mold blocks can be made of ceramics and their composites, metals or alloys, preferably of titanium or nickel alloys, particularly Ti-6Al-4V alloy, where the glass to be processed into optical components is a non-oxide glass, more particularly a chalcogenide type of glass.

Figure 7:
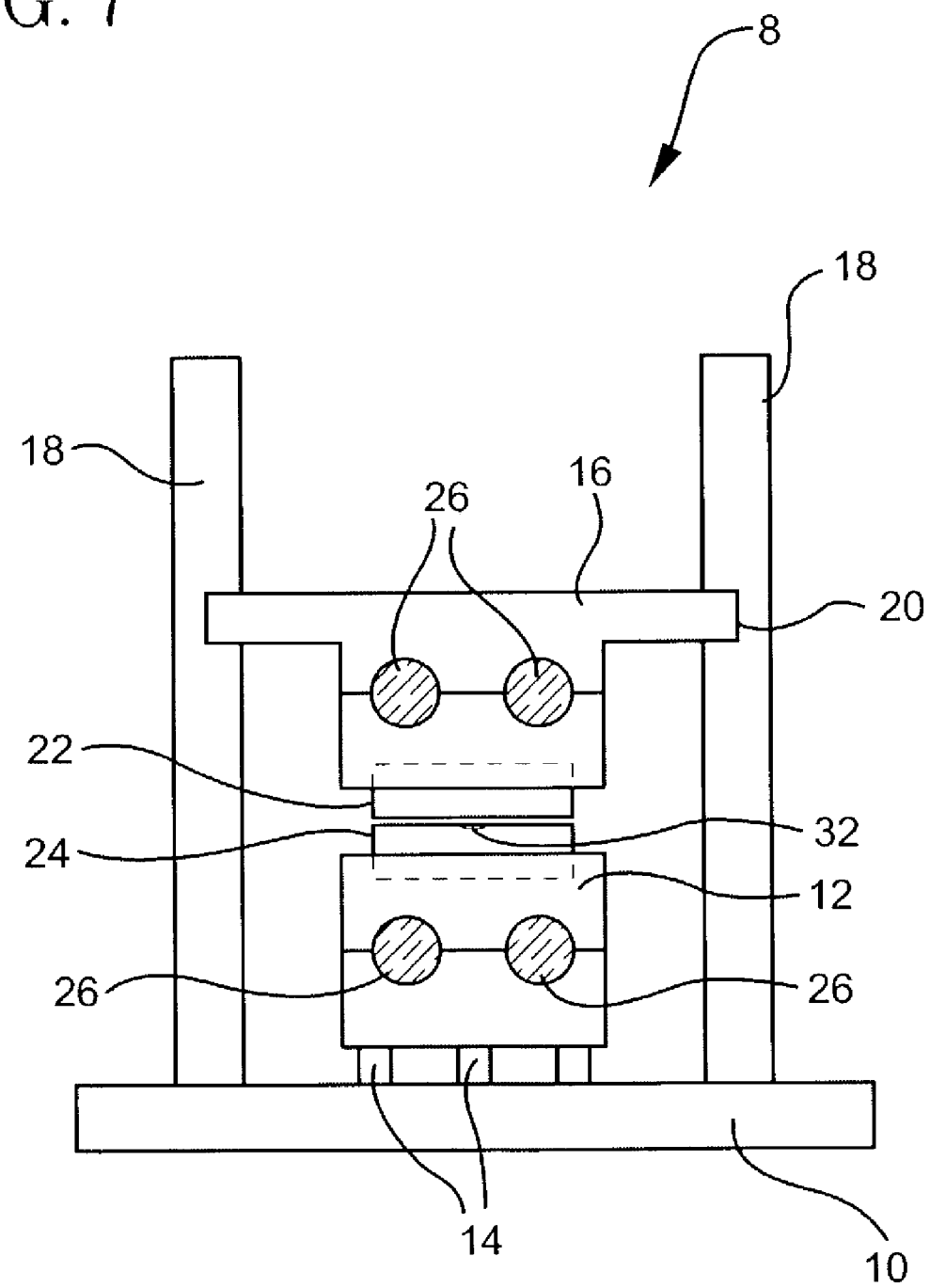
FIG. 7 is a front view of a fixture of the mold assembly in which the molding/embossing method provided by the invention may be carried out.

The specific structure of the molding apparatus is not critical to the operation of the inventive process. The press should contain some mechanism for moving the molds against the glass preform and some constraints against the motion of the molds. Such constraints are demanded to achieve the geometrical relationships required among the optical surfaces. It will be appreciated that such constraints may be constructed in a variety of ways. An apparatus developed in the laboratory for molding lenses are illustrated in FIG. 7, which is exemplary only and not limiting. Hence, for example, the addition of mechanisms for automatic loading and unloading of the glass, alternative sources of heating, cooling and press motion, and assignment of the essential functions to separate or different mechanical elements are considered to be within the technical competence or ingenuity of a worker of ordinary skill in the art.

FIG. 7 shows a face-on view of a fixture of a mold assembly 8 used. The assembly 8 accommodates a base plate 10 on which a stationary mold half is disposed, standing on insulator standoffs 14. A moveable mold half 16 is guided by guideposts 18. A mechanism (not shown) connected to a guidance device 20 for the mold assembly on the mold half 16 is connected to an actuator for applying pressure via the mold halves against glass material to be molded or embossed. This material is supported between two mold blocks 22 and 24. The blocks are captured in cavities in the mold halves 12 and 16. The mold halves are heated by electrical heater elements 26 located in each mold half 12 and 16. The mold halves may be split to capture the heater elements 26.

Figure 8A:
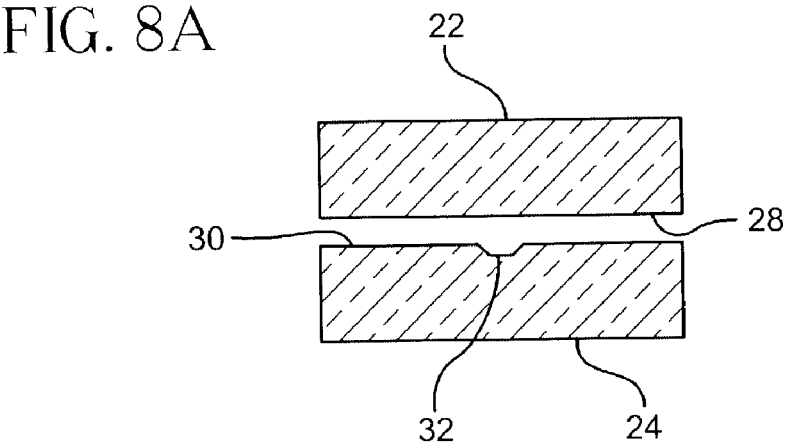
FIGS. 8A, B, and C are sectional views of pairs of mold blocks, which may be used in the apparatus shown in FIG. 7.
Figure 8B:
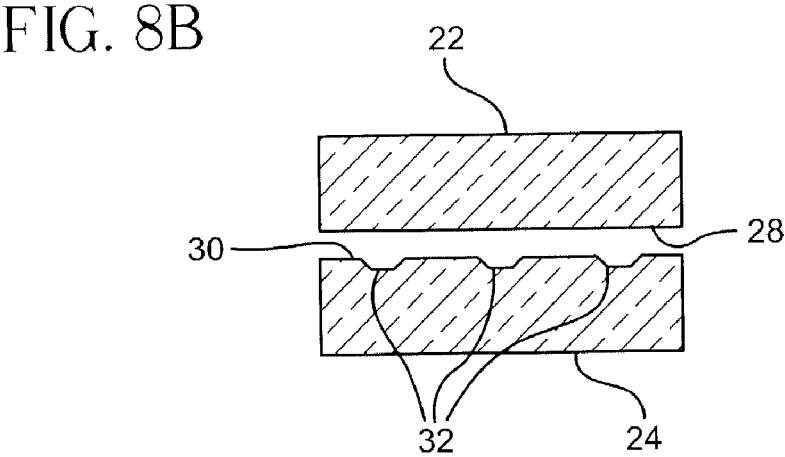
Figure 8C:
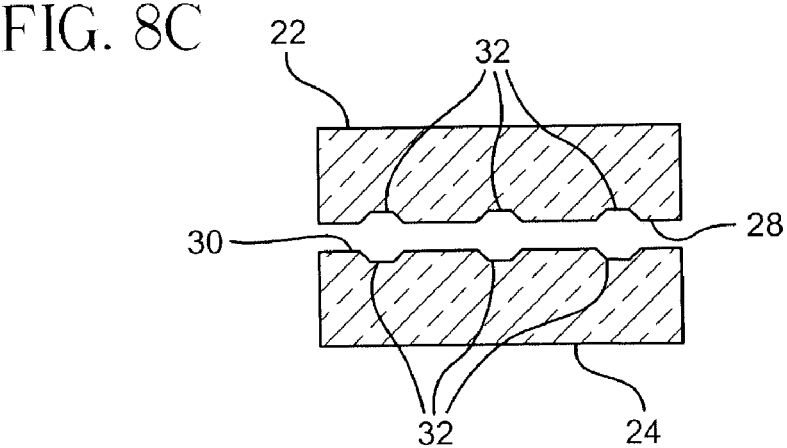

FIGS. 8A, B, and C, depict a sectional view of three alternate pairs of mold blocks used in the apparatus of FIG. 7. The mold masters of FIG. 8B may have various forms, such as spherical and aspheric, single plano-convex, plano-concave, array of such lenses, and lens arrays. The mold blocks may be cylindrical in shape. The opposite mold surfaces 28 and 30 of the mold blocks 22 and 24 define the profile of the optical component or element to be molded. Profiled cavities on the mold assembly will form various types of lenses on one side of a substrate of the glass material being molded. The profile of the molded object may be of either a convex or concave spherical lenses defined by a single concave semi-spherical mold cavity 32 (cavity for concave lens profile is not shown) in the mold surface, as shown in FIG. 8A. Alternatively, the mold cavity described can be of aspheric shaped (not shown) to produce aspheric glass lenses. For a lens array, such as depicted in FIG. 8B, of convex (FIG. 3 or 4) or concave (not shown) lenses there may be multiple cavities 32 of semi-spherical or aspheric (not shown) shapes. Other profiles, such as double convex or double concave may be formed even on opposite sides of the glass substrate which is formed in the mold, as for example with the mold blocks 22 and 24 shown in FIG. 8C.

Figure 9:
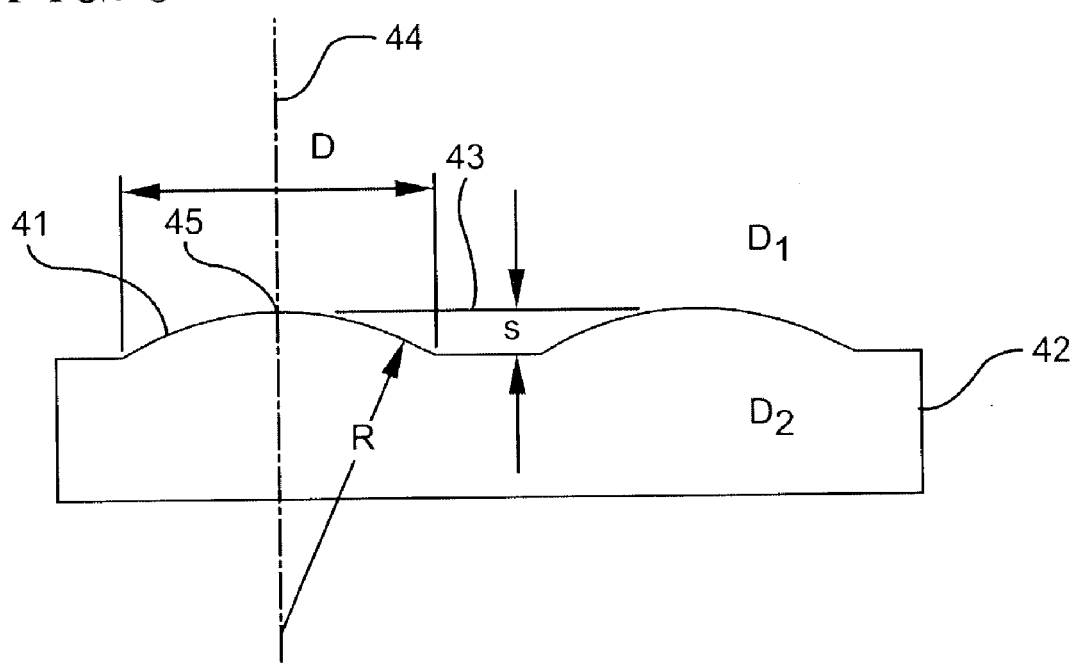
FIG. 9 depicts a cross-sectional schematic of surface-relief microlens.

In the fabrication of surface-relief microlenses (41) on a substrate (42), one critical parameter is the sag of the lens, s. As defined in FIG. 9, this parameter designates the height that the vertex (45) of the microlens extends above the substrate surface (43). For a microlens having a spherical shape of radius R, the sag is given by Eq. (1):

$$s = R - \sqrt{R^2 - (D/2)^2}, \quad (1)$$

where D is the diameter of the microlens. The radius of curvature R is calculated from the indices of refraction of the incident medium $n_1$ and that of the substrate $n_2$ and the desired focal length f according to Eq. (2):

$$R = (n_2 - n_1) f \quad (2)$$

Figure 10:
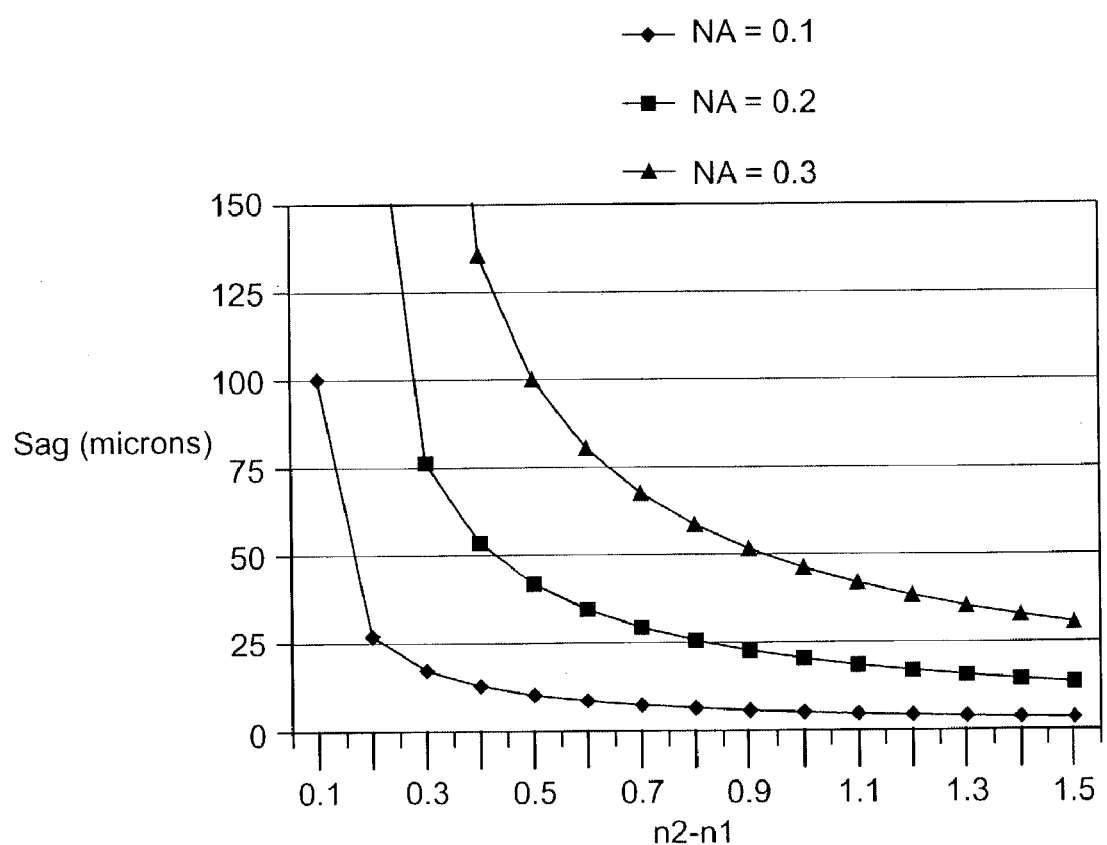
FIG. 10 is a graph plotting sag of a microlens as a function of $\Delta n$ for different numerical apertures and a focal length of 1000 micron meters ($\mu m$), see Eq. (3). Note that the sag of the microlens decreases as the index of refraction difference increases.

Substituting Eq. (2) into Eq. (1), one obtains $$s = f \Delta n [1 - \sqrt{1 - (NA/\Delta n)^2}], \quad (3)$$

where $\Delta n = n_2 - n_1$ and NA is the numerical aperture of the lens defined by $1/(2F/\#)$, where the f-number (F/#) of the lens is f/D. Graphing the sag of the microlens s as a function of $\Delta n$ for a fixed $f = 1000 \, \mu m$, but various numerical apertures one obtains the curves represented in FIG. 10. One notes that as $\Delta n$ increases, the sag of the microlens decreases. By reducing the sag of the lens, one increases the manufacturability of the lens (e.g., in a molding process, it is less likely that air will be trapped in the mold if the sag of the microlens is less). One of the most important reasons for using high-index glasses, however, is for reducing optical aberrations.

Spherical surfaces are not ideal surfaces from an imaging perspective. To image a given object, one ideally requires an aspheric surface in order to reduce aberrations. Aspheric surfaces, however, are more complicated to fabricate and to test than spherical surfaces. For low numerical apertures (<0.1) the error between the desire aspheric surface and the manufacturable spherical surfaces is generally small. For larger numerical apertures, however, this deviation increases, thereby degrading the image quality of the optical system. By using materials of higher indices of refraction (e.g., chalcogenide glasses with $n_2 > 2.0$), one can reduce the spherical aberrations of lens since the required radii of curvatures for a set focal length is reduced.

Figure 11:
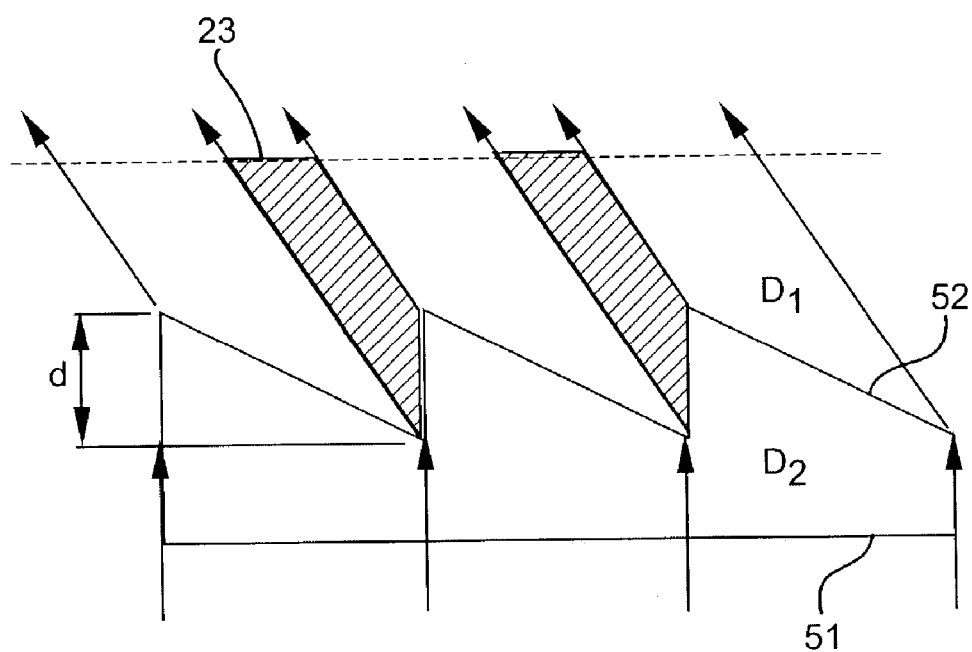
FIG. 11 depicts a schematic of a blazed grating.

For a blazed grating, a substrate (51) is patterned with a series of blazed facets (52) across one of its surfaces, see FIG. 11. The desired depths of these facets is given by $$d = \frac{\lambda}{\Delta n}, \quad (4)$$

where $\lambda$ is the wavelength of operation and $\Delta n = n_2 - n_1$. The depth of the grating therefore decreases linearly with $\Delta n$. By decreasing the depth of the grating, one decreases the width of the shadow region (53) of the grating. The shadow region is the region in which from a geometrical optical analysis there is no light due to the shadowing caused by the sidewalls of the grating facets. The shadowing reduces the efficiency of the grating in the order of interest by introducing unwanted diffraction effects. By reducing the depth of the grating (e.g., by increasing $\Delta n$), one increases the theoretical diffraction efficiency attained by the grating.

According to an embodiment for carrying out the present molding method, the glass material, either in the ingot, wafer or powder form, is placed between the opposing mold surfaces 28 and 30 of the mold blocks 22 and 24. Both upper and lower halves of the mold blocks or masters 22 and 24 are heated simultaneously. Heating and cooling rates and dwell times are determined based on working conditions and particular glass species, and may be controlled precisely using a digital temperature controller. In general, by increasing power to heating elements 26, the mold or master is heated at a predetermined rate to an operational temperature that is at least about 10° C. above the Tg of the specific glass material in the mold. Typically, the operational temperature is within a range of about 10–110° C. above Tg. In other words, the glass has a viscosity of about $10^6$ to about $10^{12}$ poises. Preferably, the temperature is about 20° C. to about 90° C. above Tg. More preferably, the temperature is about 30–70° C. above Tg. For certain chalcogenide glass samples that have a Tg in the range of approximately 100° C.–350° C., or about 130° C.–250° C., the operational temperature of the blocks 22 and 24, preferably are about 50° C. above Tg, or in the range of 150° C. to 400° C.

Concurrently with heating of the precursor glass material, a predetermined pressure is applied mechanically to the upper half of the mold against the lower half to form the optical components into the desired shapes and with hyperfine microstructures (i.e., lens or microlens array or diffraction grating, diffractive optical pattern or combinations of such lenses and patterns). A mechanical driver, for example a screw drive, connected to the guidance devices 20 on the upper mold half 16 may be employed to actuate the pressing. Alternatively, the mold assembly 8 can be put between the platens of a hydraulic press or electrically driven press, such as a machine to apply pressure on the mold blocks 22 and 24. As with heating, the exact amount of pressure depends on various factors, including the Tg of the glasses or the complexity of the features in the profile to be molded. The pressure (force) of the mold translates to about 10 to 5000 pounds per square inch (psi) of the mold surface area. For example, for glass species mentioned as suitable for molding according to the present process, the pressure can be in the range from 1 to 100 psi. Press the mold when the viscosity of the glass reaches about $10^7$–$10^{11}$ poises, preferably about $10^{10}$ poises. After reaching the pre-selected peak operational temperature, the pressure is held on the mold block assembly for a dwell time, suitably from about 0.1 to 10 minutes to ensure the completion of flow of glass material within the mold profiles or the designed patterns. For a certain composition of a specific chalcogenide glass, a dwell time, 10 sec., at the optimum temperature, 50° C. above Tg, and pressure, 20 psi, was utilized for completion of movement and filling of the viscous glass within the mold cavity. Then the pressure was gradually released. The mold is allowed to cool at a predetermined rate, 20° C./min., to 50° C. or poises, and the optical component having the desired profile is extracted from the mold assembly 8. For industrial fabrications, it is preferred that the temperature of the mold is not cooled all the way to room temperature and also use of cooling using forced air or nitrogen. Additional process steps for removing the molded product are either described by Mareschal and Maschmeyer or familiar to those in the art.

For certain glass compositions, it may be desired to apply a release coating on the opposing mold surfaces 28 and 30 of the mold halves 22 and 24. The release coatings may include: graphite carbon coating, molybdenum-di-silicide, fluorocarbon ($CF_x$), boron nitride, noble metals and alloys, and some commercially available release coatings. Boron nitride (BN) was determined to be the best release coating for molding/embossing of sulfide glasses. The release coating material can be effectively spray coated or sputter deposited on the mold surfaces. It will be noted that the molding and embossing processes in this investigation are carried out in ambient air. An airtight enclosure having an inert atmosphere or vacuum was not required for such molding and embossing processes. In the course of working with these materials, however, it was noticed that born nitride coated mold surfaces had longer service lives (i.e. more cycles of molding/embossing before repolishing the mold surfaces) compared to non-coated mold surfaces.

The foregoing general description of the method for fabricating optical components in glass and the apparatus for executing the method should be taken as illustrative and not limiting of possible variations or modifications. The examples in the following section further illustrate and describe the advantages and qualities of the present invention.

EXAMPLES

In a series of studies, it was endeavored to mold and/or emboss optical components having fine, complex microstructures in compact shapes and sizes, using non-oxide glasses from either bulk-solid or powder forms (a wafer, a cube, a irregular shaped agglomerate or powder) in the mold. Optical components, such as MLAs, required a variety of complex shapes for densely packed individual lenses, aspheric lenses, or diffraction gratings, which may be used in optical switches, optical displays and the like. In particular, chalcogenide glasses, in which oxide species are absent, impart unexpectedly favorable molding characteristics. For the experimental examples described below, all moldings were carried out in air. No inert atmospheres such as nitrogen or argon was used during molding. In some specific cases, forced air or nitrogen gas was used to facilitate cooling of the molded parts and their removal.

The glass transition temperatures (Tg) of the chalcogenide glass samples chosen for experiments ranged from about 160° C. to about 245° C. and indices of refraction were in the range of about 2.3 to about 2.5. The precursor glass material was in the form of a wafer having thickness in the range of 0.25 to 2 mm and 20 to 300 mm in diameter. Alternatively, fine glass powders (less than 0.1 mm in diameter), and cube or irregular shaped solid block of glass were also used as precursor material. Note this is in contrast with the preforms required in the molding processes developed by Kodak (EP 1 069082 A2), Corning (U.S. Pat. No. 4,481,023), and possibly, by Geltech. We placed the glass, either in wafer or in powder form, between the opposing mold surfaces of the mold blocks. The temperature of the mold blocks was increased from room temperature to about 50° C. above the Tg of the specific glass material in the mold by increasing the power input to the heater elements. The temperature of the blocks was in the range of 220 to 300° C. in the case of the chalcogenide glasses used (Table 1, Examples 1 & 2). Concurrently with heating of the glass precursor material, we applied mechanical pressure in the range of 1 to 100 psi to the upper mold portion. The amount of pressure applied depended on factors such as the spatial frequency and depths of the features in the profile to be molded as well as the Tg of the glasses. In order to apply pressure on the mold blocks, we placed the mold assembly between the platens of a hydraulic or electrically driven press, such as an Instron machine. After reaching the pre-selected peak temperature, the pressure was applied and was held on the mold block assembly for a dwell time, typically from about 5 to 60 seconds, to ensure the complete flow of glass material within the mold. After this dwell time, we gradually released pressure and reduced the temperature of the mold block back to room temperature, as programmed in the temperature controller.

After investigating several mold materials (including titanium and its alloys, aluminum and its alloys, and steels, particularly series 440 stainless steels), a specific titanium alloy, Ti-6Al-4V alloy, and/or electroless high phosphorous nickel alloy were chosen as suitable mold materials, specifically for their stability at the molding temperature used for molding these sulfide glasses. These materials have coefficients of thermal expansion (CTE) of approximately 10 to 20 ppm/° C. and a recrystallization temperature in the range of 700 to 900° C. Oxidation of some of the mold materials, particularly aluminum and iron-based alloys, prevented the use of those materials.

We molded precision microlenses, such as those required to collimate fibers, to measure the change in surface profile (e.g., radius of curvature) between that of the master and that of the molded glasses. The mold cavity was machined using a carbide tool and then diamond-polished using of 10 μm grit. The higher precision masters we molded were fabricated utilizing single point diamond turning. But the mold material was not subject to any other special treatment, except to anneal for relief of stresses due to machining.

The present invention can replicate microstructures as deep as 500 µm in chalcogenide glasses in a fraction of an hour. Such a process can convey commercial advantage in the manufacturing of cost-effective, precision, optical microstructures for optical surface-relief elements. In contrast, reactive ion etching techniques can take as long as 12 to 24 hours to etch 50 to 100 µm deep microlenses into fused silica. The capital expense of reactive ion etching and the associated support equipment and human resources is significant and is typically measured in millions of dollars.

Figure 12:
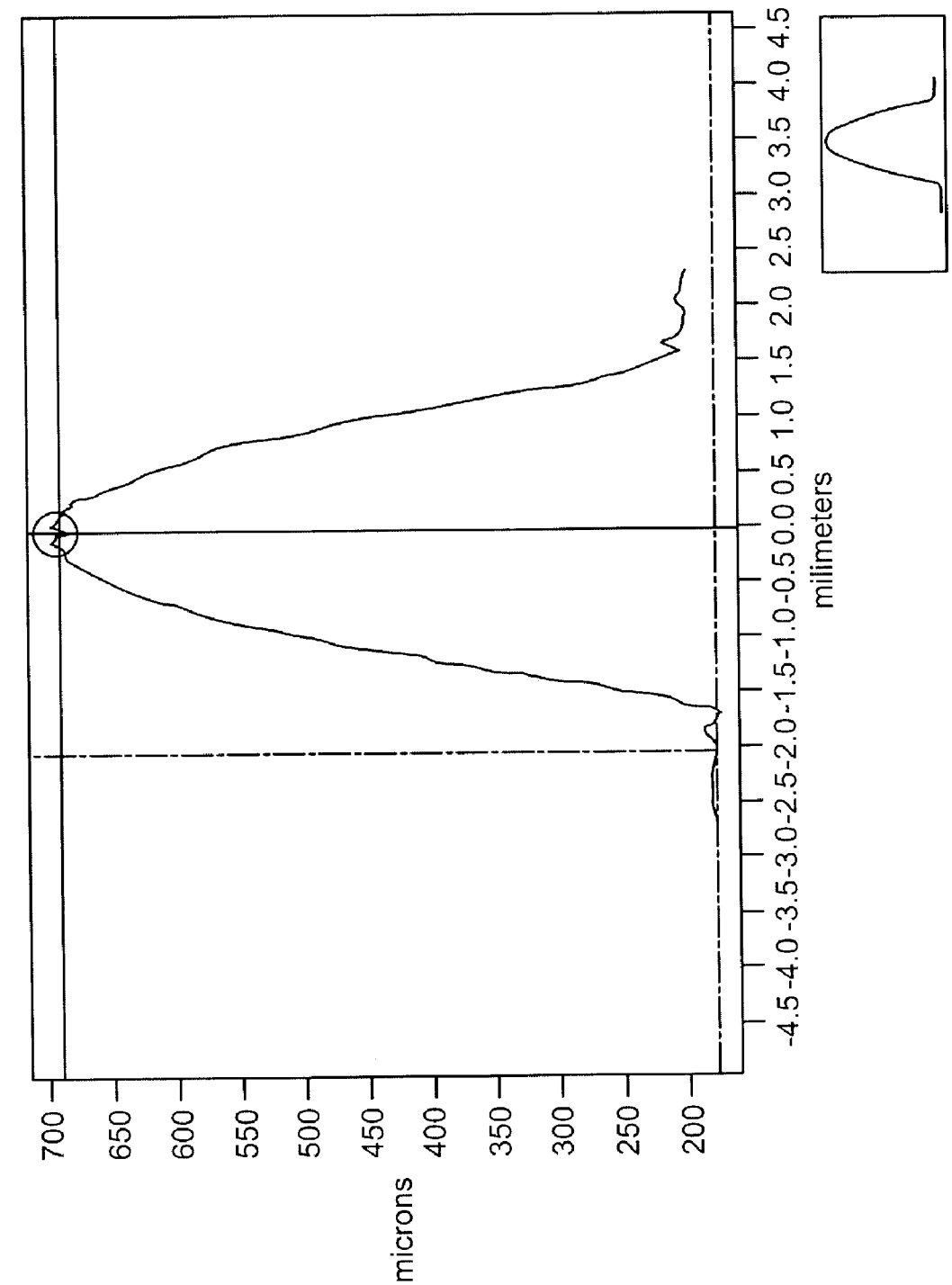
FIG. 12 shows the profilometer trace of the mechanical surface of a microlens-type profile molded from a chalcogenide glass. The master was a titanium alloy substrate machined with a mill to create a 513 micron meters ($\mu m$) deep divot.

FIG. 12 illustrates the result of a microlens-profile molded using the glass of designated Example 1, in Table 1 (8.75% Ge, 17.5% As, and 73.75% S), as the fine precursor frit (~10 µm). For this experiment, the titanium mold or master had a concave surface-relief structure of diameter of 3 mm clear aperture and a sag of 513 µm. In order to mold this type of structure, the mold surface was coated with BN by aerosol assisted spraying. After the frit powder was deposited in the mold cavity at room temperature, the mold was raised to 300° C. at a rate of 20° C./min. The material was held at 300° C. for about 5 minutes before a force of 20 psi was applied. The force was released after about a minute and the mold was cooled down to room temperature at a rate of 1° C./min. One notes from the profile trace in FIG. 12 that the molding process had no difficulty replicating a 513 µm deep structure.

The molding of microstructures as fine as 5 µm can be resolved also using the glass of Example 1. At an operational molding temperature and pressure of only 245° C. and 50 psi, respectively, we were able to fabricate a 1.3-mm diameter, 0.94-µm deep, diffractive lens having 5 µm as its smallest grating period, using a single-point diamond-turned, high-phosphorous electroless nickel substrate as the mold master. Table 2 summarizes the experimental conditions. For this experiment, the wafer of Example 1 was inserted into the mold only after it had already reached 245° C. Based upon the sharpness of the diffractive zones achieved, it believed that the resolution of the Example 1 glass is significantly less than 5 µm. Potentially, the resolution limit of the present molding process and chalcogenide glasses can be refined and used to replicate wavelength dispersion gratings with grating periods of approximately 1 µm or finer, such as for wavelength division multiplexer (WDM) modules.

TABLE 2

Parameters for Molding Experiment

| Parameter | Value |
| --- | --- |
| Glass | Example 1 in wafer form (5 mm diameter, 2 mm thickness) |
| Master | High-phosphorous electroless nickel |
| Release coating | None |
| Max. temperature | 245° C. |
| Pressure | 50 psi |
| Molding time (heating, pressing, cooling) | 30 min. |

Figure 13:
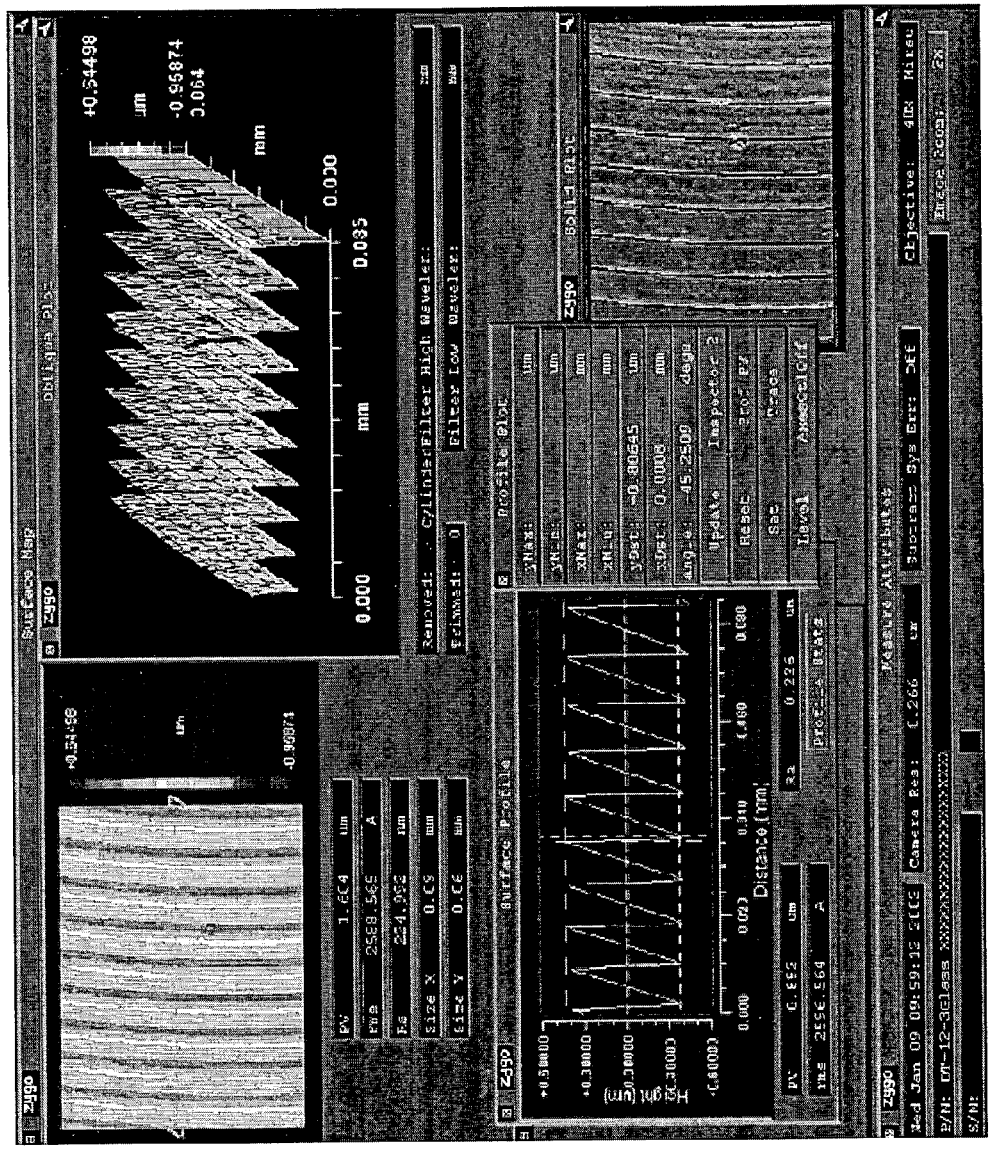
FIG. 13 shows profilometry data for a chalcogenide-molded diffractive lens having a 9 $\mu m$ zone spacing. The fidelity of the replicated zones are excellent and the measured width of the zone transition is essentially limited by the lateral resolution of the imaging apparatus.

Afterwards, the molded-glass, diffractive, optical microstructures were examined using a Zygo NewView 100 for surface roughness and grating feature fidelity. The surface finish of the molded structure was found to average 55 Å rms, while the master had a surface finish of 40 Å rms. FIG. 13 illustrates the 2-dimensional and 3-dimensional profiles of diffractive structures replicated according to the present invention. The fidelity with which the structures (grating grooves of ~9 µm or larger) were reproduced was excellent. To the lateral resolution of the NewView (1 µm), we observed no signs of degradation of the sharp zone transitions when comparing those of the master to those of the replica. Gratings with a 2-D cross-section of about 8 µm or about 5 µm wide zone periodity can be made for diffractive lens. Certain precautions may be advisable, however, such as applying release coatings to overcome adhesion issues. Although adhesion issues can degraded the quality of sub-8 µm period zones, the viscosity of the glass of Example 1 was sufficiently low enough to replicated with excellent fidelity the sharp zone transitions of the nickel diffractive master. Hence, it is believed that the viscosity-limited resolution of the molding process using Example 1 is significantly less than 5 µm.

In addition to investigating the resolution limits of the process, we also investigated different release coatings. A number of release coatings, such as graphite carbon, molybdenum-di-silicide, fluorocarbon, boron nitride, some commercially available release coatings (e,g, Zinc Stearate Mold release, Thermoset release, Dry Film Mold release, Rocket Release etc. manufactured by Stoner Incorporated, Quarryville, Pa.) were evaluated from the criteria of their effectiveness in improving the surface smoothness of the molded optical components and the life cycle of the mold surfaces. For each release coating, we evaluated their effectiveness in maintaining the surface quality of the mold cavity and the lifetime of the release-coated mold surfaces. From a number of experiments, it was determined that boron nitride (BN) was the most effective release coating material of the group for the molding. Boron nitride coated mold surfaces, particularly for the titanium alloy molds, had longer service lives (i.e., more cycles of molding/embossing in between cleaning or repolishing of the mold surfaces) compared to non-coated mold surfaces.

In general, the coatings for releasing surface-sensitive components from the molds are best applied either by physical or chemical vapor deposition techniques. In the absence of thin-film coating facilities, the release coating material may be effectively spray coated on the mold surfaces. Spray coating on polished mold surfaces, however, tends to increase the roughness of the mold surfaces because of the particulate nature of the spray-coating material. As a result, the molded lens surfaces replicated the roughness of the mold surfaces caused by spray-coatings. Sputter-deposited films/coatings are more preferred for optical surface release due to the smoothness of the resulting release coating surfaces. For chalcogenide, in particular sulfide glasses, and chalco-halide glasses, surprisingly, a release coating was not required when titanium alloy and high phosphorous electroless nickel molds were used. Other nickel alloy surfaces also do not necessarily require a release coating.

The present invention has been described generally and in detail by way of examples and the figures in detail and by way of examples of preferred embodiments. Persons skilled in the art, however, can appreciate that the invention is not limited necessarily to the embodiments specifically disclosed, but that substitutions, modifications, and variations may be made to the present invention and its uses without departing from the scope of the invention. Therefore, changes should be construed as included herein unless they otherwise depart from the scope of the invention as defined by the appended claims and their equivalents.

We claim:

1. A method of making a precision optical element, the method comprises:
   (a) providing a non-oxide glass with a glass transition temperature (Tg) of up to about 550° C.;
   (b) providing a mold having an active surface that has an optical finish, wherein said active surface if made of a titanium alloy with a composition, in terms of weight percent, comprising about 98–80% Ti, 1–10% Al, and 1–10% V;

(c) placing said glass in said mold;
(d) heating said mold and glass to an operational temperature from about 10° C. to about 110° C. above the Tg; and
(e) pressing the mold when the viscosity of the glass reaches about $10^6$–$10^{12}$ poise;
(f) cooling the mold at a predetermined rate; and
(g) extracting the optical element from the mold;
wherein, optionally, said titanium active surface is coated with a release agent.

2. The method according to claim 1, wherein said glass is in the form of a frit powder, planar body, regular or irregularly shaped bulk-solid, or a combination thereof.

3. The method according to claim 1, wherein said glass is a chalcogenide glass.

4. The method according to claim 3, wherein said glass is a sulfide glass.

5. The method according to claim 4, wherein said sulfide is selected from the group consisting of $GeAs_2S_2$, $As_2S_3$, $Ga_2S_3$, and $Is_2S_3$.

6. The method according to claim 3, wherein said glass is a selenide glass.

7. The method according to claim 3, wherein said glass is a telluride glass.

8. The method according to claim 1, wherein said glass is a chalco-halide glass.

9. The method according to claim 1, wherein said glass is a halide glass.

10. The method according to claim 1, wherein said release agent is boron nitride.

11. The method according to claim 1, wherein said mold further comprises at least a first portion and a second portion.

12. The method according to claim 1, wherein said operational temperature is in the ranges from about 20° C. to about 90° C. above Tg.

13. The method according to claim 1, wherein said operational temperature is in the range from about 30–70° C. above Tg.

14. The method according to claim 1, wherein said viscosity of the glass is about $10^7$–$10^{11}$ poise.

15. The method according to claim 14, wherein said viscosity of the glass is about $10^9$ poise.

16. The method according to claim 1, further comprising applying heat and pressure to said glass in said mold until said glass sags and deforms into a desired conformation of said optical element.

17. The method according to claim 16, wherein said pressure is applied mechanically between said first portion driven into said second portion of said mold.

18. The method according to claim 1, further comprises the step of inserting blocks into the mold.

19. The method according to claim 18 wherein said blocks are inserted when said glass is in the form of a wafer or powder.

20. The method according to claim 1, further comprises the step of placing on a molding surface of said blocks a layer of material, which is non-reactive with said glass at the operational temperature.

21. The method according to claim 1, further comprises the steps of hardening said glass in the mold, removing the glass, and further processing a resultant glass article.

22. The method according to claim 1, wherein said heating and pressing steps are performed in an ambient air atmosphere.

23. The method according to claim 1 wherein providing a mold means providing a mold such that said optical element produced by said method has a surface feature of less than a millimeter.

24. The method according to claim 1, wherein said mold is capable of providing said optical element having fine microstructures of less than or equal to about 100 microns.

25. The method according to claim 1, wherein p said mold is capable of providing said optical element having hyperfine microstructures of less than or equal to about 10 microns.

26. The method according to claim 1, wherein said mold is capable of providing said optical element selected from the group consisting of a lens, microlens, array of lens or microlens, grating, surface relief diffuser or fresnel lens.

27. The method according to claim 1, wherein said mold is capable of providing said optical element as part of a forward-looking infrared (FLIR) system.

28. A method of making an opto-electronic element, the method comprising:
providing a non-oxide glass having a glass transition temperature (Tg) up to 550° C. as granular, planar, or bulk-solid items;
providing a two part mold having an active surface that has an optical finish made of a titanium alloy with a composition, in terms of weight percent, comprising about 98–80% Ti, 1–10% Al, and 1–10% V,
charging said mold with said glass,
heating said mold to an operational temperature of at least 10° C. above said Tg; and
hot-pressing said glass at a viscosity of about $10^7$ to $10^{12}$ poise;
cooling the mold at a predetermined rate; and
extracting the optical element from the mold;
wherein, optionally, said active surface of said mold is coated with a release agent.

29. The method according to claim 28, wherein said hot-pressing step occurs in an oxygen-containing atmosphere.

30. The method according to claim 28, wherein said operation temperature does not exceeding about 110° C. above said Tg.

31. The method according to claim 28, wherein said glass is a chalcogenide glass.

32. The method according to claim 31, wherein said glass is a sulfide glass.

33. The method according to claim 31, wherein said glass is selenide glass.

34. The method according to claim 31, wherein said glass is a telluride glass.

35. The method according to claim 28, wherein said glass is a chalco-halide glass.

36. The method according to claim 28, wherein said glass is a halide glass.

37. The method according to claim 28, wherein said mold is capable of providing said opto-electronic element having either fine or hyperfine microstructures.

38. The method according to claim 28, wherein said mold is capable of providing said opto-electronic element selected from the group consisting of a lens, microlens, array of lenses or microlens, grating, surface relief diffuser or fresnel lens.

39. The method according to claim 28, wherein said mold is capable of providing said optical element as part of a forward-looking infrared (FLIR) system.

40. The method according to claim 1, wherein the release agent is selected from the group consisting of a graphite carbon coating, molybdenum-di-silicide, a fluorocarbon ($CF_x$), and noble metals and alloys.

41. The method according to claim 28, wherein the release agent is selected from the group consisting of a graphite carbon coating, molybdenum di-silicide, a fluorocarbon ($CF_x$), and noble metals and alloys.

* * * * *